US006449461B1

(12) United States Patent
Otten

(10) Patent No.: US 6,449,461 B1
(45) Date of Patent: *Sep. 10, 2002

(54) SYSTEM FOR MOBILE COMMUNICATIONS IN COEXISTENCE WITH COMMUNICATION SYSTEMS HAVING PRIORITY

(75) Inventor: David De Sales Otten, Redondo Beach, CA (US)

(73) Assignee: Celsat America, Inc., Redondo Beach, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 925 days.

(21) Appl. No.: 08/679,848

(22) Filed: Jul. 15, 1996

(51) Int. Cl.[7] ............................. H04B 1/10; H04B 15/00
(52) U.S. Cl. ........................................ 455/63; 455/67.3
(58) Field of Search .................... 455/63, 67.3, 69, 455/60, 33.1, 56.1, 54.1, 12.1

(56) References Cited

U.S. PATENT DOCUMENTS

| 5,448,754 A | * | 9/1995 | Ho et al. ....................... 455/63 |
| 5,475,866 A | * | 12/1995 | Ruthenberg ................. 455/56.1 |
| 5,497,503 A | * | 3/1996 | Rydberg et al. ............. 455/33.1 |
| 5,507,020 A | * | 4/1996 | Lee ............................... 455/63 |
| 5,511,233 A | * | 4/1996 | Otten ......................... 455/56.1 |
| 5,526,402 A | * | 6/1996 | Dent et al. .................. 455/33.1 |
| 5,548,800 A | * | 8/1996 | Olds et al. .................. 455/12.1 |
| 5,634,198 A | * | 5/1997 | Cameron et al. .............. 455/63 |
| 5,649,303 A | * | 7/1997 | Hess et al. ..................... 455/63 |

OTHER PUBLICATIONS

Klandrud et al, "Beacon Control of Radio Transmitters to Reduce Radio Frequency Interference", Motorola Inc., Technical Developments, vol. 16, Aug. 1992, pp. 130–132.*

* cited by examiner

*Primary Examiner*—Vu Le
(74) *Attorney, Agent, or Firm*—Drummond & Duckworth

(57) ABSTRACT

A mobile communications system for permitting the communications of a mobile unit in proximity to a communications service having priority over the communications of the mobile unit. An interference zone is formed around the priority communications site such that if the mobile unit were to transmit in the frequency band of the priority system, interference would be created with the operation of the priority receiver. In order to eliminate interference with the priority system by the mobile unit, a proximity detector determines if the mobile unit is located in the interference zone. Once the determination has been made that the mobile unit is located in the interference zone, the mobile unit alters its transmission to eliminate the interference of the mobile unit with the priority service. Interference may be eliminated, or in other terms, the interference zone may be altered, by ceasing the operation of the mobile unit, changing the operating frequency of the mobile unit, reducing the transmitting power of the mobile unit or by other means well known to those in the art.

2 Claims, 6 Drawing Sheets

SYSTEM FOR MOBILE COMMUNICATIONS IN COEXISTENCE WITH COMMUNICATION SYSTEMS HAVING PRIORITY

BACKGROUND

The invention is related generally to mobile communications and more particularly to a system and method for operating in an area and in a frequency spectrum in which existing communication systems are already operating.

The mobile communications industry has grown at a fast pace in the United States and even faster in some other countries. It has become an important service of substantial utility and because of the growth rate, saturation of the existing services is of concern. Contributing to this concern is the congestion of the electromagnetic frequency spectrum which is becoming increasingly severe as the communications needs of society expand. This congestion is caused not only by fixed microwave service or site ("FMS") installations and Broadcast Auxiliary Services (BAS) but also by other communications systems including mobile communications systems. In the mobile communications industry alone, it is estimated that the number of world-wide mobile subscribers will increase by an order of magnitude in the next ten years. The radio frequency spectrum is limited and in view of this increasing demand for its use, means to use it more efficiently are constantly being explored.

Increasing demands for mobile radio service have put great strain on the frequency allocation process. This is particularly true for those frequencies currently felt to be uniquely usable for mobile radio; that is, the UHF band from roughly 300 to 3,000 MHz. Much of this precious spectrum is presently allocated to various kinds of services using receivers located at fixed sites. In recognition of the particular value of these frequencies for mobile radio service, the Federal Communications Commission ("FCC") has proposed plans for relocating some of the fixed microwave service users to other frequency bands to make room for emerging technologies and personal communications systems particularly in the mobile services. Relocation may be a lengthy process taking place over many years. In the meantime, new mobile services may be licensed on a "not-to-interfere" and "not-to-claim interference" basis with respect to the incumbent systems.

Detailed study of the geographic distribution of the present microwave service licensees indicates that while in certain geographical areas these bands are almost fully allocated for use as fixed microwave services of a given type, there is still considerable usable frequency spectrum available in the geographical and frequency spaces between the interference zones of present microwave service installations.

For example, Electronic News Gathering (ENG) communication systems operate extensively in the United States. ENG employs a variety of auxiliary services to support basic television operation. Five major video auxiliary services, (studio transmitter links (STL), intercity relays (ICR), temporary fixed systems, van mounted transportable ENG systems and point of view systems), utilize a variety of frequency bands collectively known as the Broadcast Auxiliary Services (BAS) bands. The 1990–2110 MHZ band is used as the primary ENG band because of favorable propagation effects. ENG services include both mobile point of view and transportable ENG systems which provide mobility for news coverage throughout a geographic region. Due to limits on frequencies, time sharing of channels and the fact that multiple ENG receive sites and systems only exist in the largest television markets, there is still considerable usable spectrum available in the geographical spaces between the interference zones of the service installations.

As used herein, an "interference zone" refers to a geographic region surrounding a system or site having priority over other systems in a designated frequency band operating in the electromagnetic spectrum within which harmful interference would be encountered from other systems operating in the same frequency band. The priority system may be mobile or fixed. Should the transmission by a second system interfere with the reception of a first "priority" system, the second system would be considered to be operating in the interference zone of the first system. Should the receiver of a second system receive harmful interference from the transmission of a first system, the second system would also be considered to be operating in the interference zone of the first system.

In a system that provides both transmission and reception, there are thus two interference zones and these two interference zones may differ. A "transmit interference zone" is a minimal geographical region about the fixed system's radio communication receiver system defined for a particular frequency band where transmission by a mobile transmitter system on that frequency band in that geographical region could cause harmful interference to the fixed system's receiver system. A "receive interference zone" is a minimal geographical region about a fixed system's radio communication transmitting system defined for a particular frequency band where a mobile receiver system in that frequency band within that geographical region could receive harmful interference from the fixed system's transmitting system. The interference zone is specified by frequency bands and by three dimensions of geography.

Geosynchronous communications satellites over the United States have shared frequency spectrum with fixed microwave service ground towers from the beginning of the commercial space age. Such coexistence is practical because the satellite-to-terrestrial microwave geometry is fixed at a range of about 22,000 nautical miles and at elevation angles greater than about 20 degrees. This provides an acceptably large minimum angle between a geostationary satellite and the fixed ground microwave system. When the ground fixed microwave system follows category "A" antenna requirements in accordance with FCC regulations, and the satellite appropriately limits its flux density on the ground, the two systems can operate on a mutually non-interfering basis. Even though the two systems use common frequencies, the satellite service is not in the interference zone of the ground tower systems and vice versa.

This compatible operation of geostationary satellite systems with terrestrial microwave stations in a common frequency band is facilitated by their fixed positions, the large distance between them, and the directivity of their antennas. Because the satellite system does not move relative to the FMS, BAS or other systems with fixed sites, it will never be in a geographically interfering position with the terrestrial microwave stations. Such is not the case with mobile users. Because mobile users are capable of continuously changing position and their antennas are not directive, their operation could interfere with an existing station. This arrangement would not provide a suitable "not-to-interfere" system with the existing licensees. However, as discussed above, there exists a large amount of geographical regions and frequency spectrum that is unused between the interference zones of the existing stations.

Hence those skilled in the art have recognized the need for a suitably agile, intelligent communications system having mobile radio users that can coexist with service installations operating in fully allocated frequency bands. Those skilled in the art have also recognized the need for a communications system for mobile users that can coexist on a not-to-interfere and not-to-claim interference basis with fixed microwave and BAS service. The present invention meets this need and others.

SUMMARY OF THE INVENTION

Briefly and in general terms, the invention is directed to a communication system for permitting the communications of a mobile unit in proximity to a communications service having priority over the communications of the mobile unit. The mobile unit transmitters operate in the general region of fixed site receivers, or even mobile receivers, of another service which has priority while using the same frequency band as that priority service. The invention eliminates interference with the priority service receivers when the mobile units of the secondary system roam into the transmit interference zones of the priority service receivers.

In one aspect of the invention, the priority communication system includes a receiver for receiving signals in a frequency band. The invention further includes a mobile communications unit including a receiver and transmitter with the transmitter transmitting in the same frequency band. An interference zone is formed around the priority communications site such that if the mobile unit were to transmit in the frequency band of the priority system it would cause interference with the operation of the priority receiver. In order to eliminate interference with the priority system by the mobile unit, the present invention includes a proximity detection means for determining if the mobile unit is located in the interference zone. Once the determination has been made that the mobile unit is located in the interference zone, means are provided for eliminating the interference of the mobile unit with the priority service. Interference may be eliminated, or in other terms, the interference zone may be altered, by ceasing the operation of the mobile unit, changing the operating frequency of the mobile unit, reducing the transmitting power of the mobile unit or by other means well known to those in the art.

In a first preferred embodiment of the invention, a transmitter is located at the priority site, collocated with the antenna serving the receiver of the priority service at that fixed site. The transmitter continuously or periodically (say, several times per second) emits a warning signal at one or more frequencies at close to the same frequency as the priority receiver operates through the priority site receiver antenna, or through an antenna which has the same general coverage pattern as the antenna serving the fixed site receiver and which is collocated with that antenna as closely as possible. This warning signal is intended for the mobile unit. The power level for this periodic signal is set at a magnitude such that the mobile unit detects and measures its power magnitude and processes that measurement to determine if it is inside the priority site interference zone. The mobile unit ceases transmissions when it determines that it is inside the transmit interference zone, or adjusts the mobile unit transmission to a low enough level that it will not interfere with the priority service receiver.

In this same aspect of the invention, it may be that different mobile receivers of the mobile service may have different thresholds of detection and also different transmitter power levels. Each mobile unit of distinct design would then be required to measure the signal strength of the warning signal and knowing its own transmitter power level, determine if the mobile unit transmitter is inside the transmit interference zone. In this process, the mobile unit transmitter power level may be decreased to, in turn, decrease the size of the transmit interference zone. In some simple implementations of the invention, the measurement of the power level need not be made when the mere detection of the warning signal is all that is required to determine that the mobile unit is inside the transmit interference zone and that the mobile unit transmitter should be turned off or prevented from turning on to transmit if it is already off. In another aspect of the invention, the mobile unit may simple switch to a frequency that does not interfere with the operation of the priority service provider.

In a second embodiment of the invention, a warning signal receiver is collocated with the priority service receiver. This warning signal receiver shares the fixed site priority service receive antenna or uses its own antenna that has nearly the same coverage and pattern as the priority service fixed site antenna and is collocated with it as closely as possible. The mobile unit system is designed so that the mobile units continuously or periodically transmit warning signals which identify each mobile unit and which are received by the warning signal receiver collocated at the priority service fixed site. The warning signal receiver will continuously detect and track all mobile unit transmitted signals that are in range of the priority site but not so close as to interfere with the reception of the priority service signals.

The invention is also based on the physical principal that two different microwave signals at almost the same carrier frequency (i.e., within the allocated priority service frequency band) will follow the same propagation path and attenuate over that path almost the same amount as a percentage of the transmitted power. Thus, if the emitted power of the warning signal is set at a known level with respect to a mobile unit communications signal, the power received by the warning signal receiver collocated with the priority service receiver will, with suitable corrections for the slight difference in frequency, be an indication of the power that would be received by the priority service from a potentially interfering communication signal from that same mobile unit.

The warning signal receiver measures the received signal power of a mobile unit transmission so that when the signal power exceeds a certain level, a warning command is generated and transmitted from the priority site to the potentially interfering mobile unit to either turn off that unit's transmitter, to reduce its transmitted power to a level that will not interfere with the priority service, or to change its transmissions to a non-interfering frequency. The received power level threshold at which the turn-off command would be sent would be selected such that the mobile unit communication channel transmissions (that may be at a frequency anywhere within the allocated priority service band) will not interfere with the priority service. If the mobile unit was commanded off, after a suitable period long enough to allow the mobile unit to leave the transmit interference zone, the mobile unit would resume transmission of the special narrow band signal and the process would repeat as above until the mobile unit is outside the transmit interference zone, at which point it would be allowed to turn on its communication channel.

Other aspects and advantages of the invention will become apparent from a review of the drawings and the following detailed descriptions of preferred embodiments.

DETAILED DESCRIPTION OF PREFERRED EMBODIMENTS

The present invention is directed to a communication system for permitting the communications of a mobile unit in proximity to a communications service having priority over the communications of the mobile unit. The mobile unit transmitters operate in the general region of fixed site receivers, or even mobile receivers, of another service which has priority while using the same frequency band as that priority service. The invention eliminates interference with the priority service receivers when the mobile units of the secondary system roam into the transmit interference zones of the priority service receivers.

Figure 1:
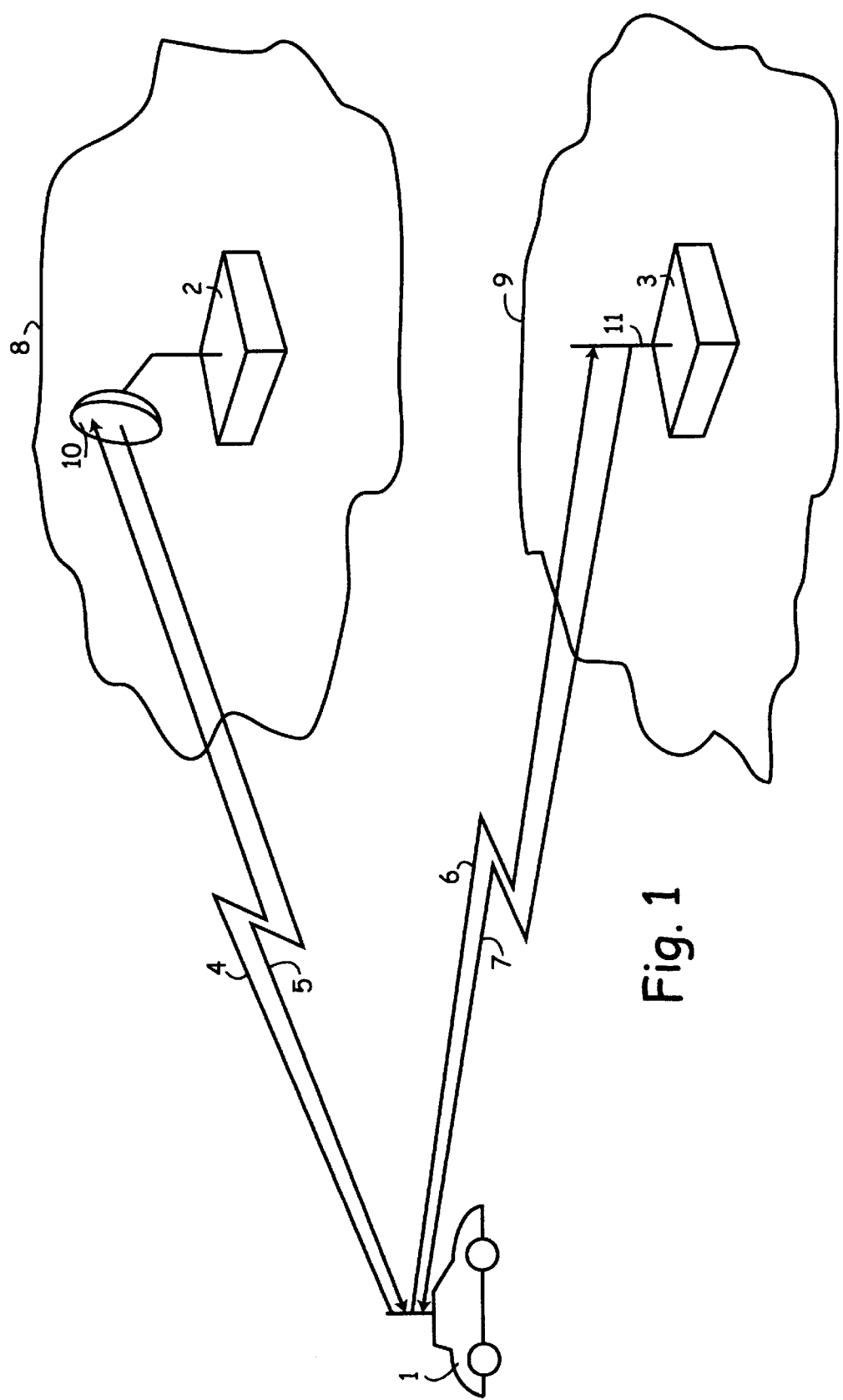
FIG. 1 is a block diagram of a preferred embodiment of the invention showing a mobile unit receiving a warning signal from two priority service fixed sites.

Referring to FIG. 1, the communications system of the present invention includes a priority system including at least one priority service antenna 2 and 3 for receiving signals in a specific frequency band. The system further includes at least one mobile unit 1 operating as a different, or "secondary" system, in the same frequency band as the priority service provider. FIG. 1 is shown to include two priority sites 2 and 3 and one mobile unit 1 operating in the same frequency band.

In a preferred embodiment, the invention includes a warning signal transmitting antenna 10 and 11 located near the priority service antenna. Surrounding the priority sites 2 and 3 are transmit interference zones 8 and 9 for respective priority sites 2 and 3 which are geographic regions where harmful interference would be encountered from other systems operating in the designated frequency band. In operation, the warning signal antenna transmits a warning signal which is received by the mobile unit 1. Preferably, the warning signal antenna is the same as the priority service receiver antenna 10 and 11 at the priority site so that the coverage and gain patterns for the transmitted and received signals are as similar as possible to ensure that a warning signal 5 and 7 received at the mobile unit 1 bears the same relationship to the power of a potential interfering signal 4 and 6 from the mobile unit throughout the coverage field, no matter where the mobile unit might be located. The mobile unit then measures the received signal power of the warning signal 5 so that when the signal power exceeds a certain level, a warning command is generated to either turn off that mobile unit's transmitter, to reduce its transmitted power to a level that will not interfere with the priority service, or to change its transmissions to a non-interfering frequency.

This invention is thus based on using the physical principal of transmission reciprocity: That microwave radio signals of the same frequency, or almost the same frequency, will propagate in both directions along a signal path with the same attenuation due to free space losses, building shadowing and reflecting, foliage transmissibility, other natural atmospheric and environmental effects, and other man-made effects. In the implementation of this invention, the warning signal power may be increased or decreased somewhat to account for the use of warning signal frequencies which are somewhat different from the fixed site receiver frequency, and also to maybe provide for a margin of safety in commanding the mobile transmitter to not transmit.

There may be multiple signal paths, especially in an urban environment, and Rayleigh fading or Rician fading will be commonplace. It is important for the warning signal frequency to be as close to the protected signal frequency as possible so that the fades occur at very nearly the same locations for the two signals, and of course also, so that the other propagation losses are as similar as possible. The use of two or more frequencies for the warning signals will provide frequency diversity, so that when one warning signal is fading, the other is not fading (with high probability). Mobile units moving at moderate speeds will have many fades per second and the warning signal received power can be averaged over a moderate interval (say, one second) to mitigate the effect for these units. However, in some circumstances a safety margin will have to be added to the warning signal power measurement value to account for the difference in multipath fading and other differences in propagation losses for the two frequencies.

Figure 2:
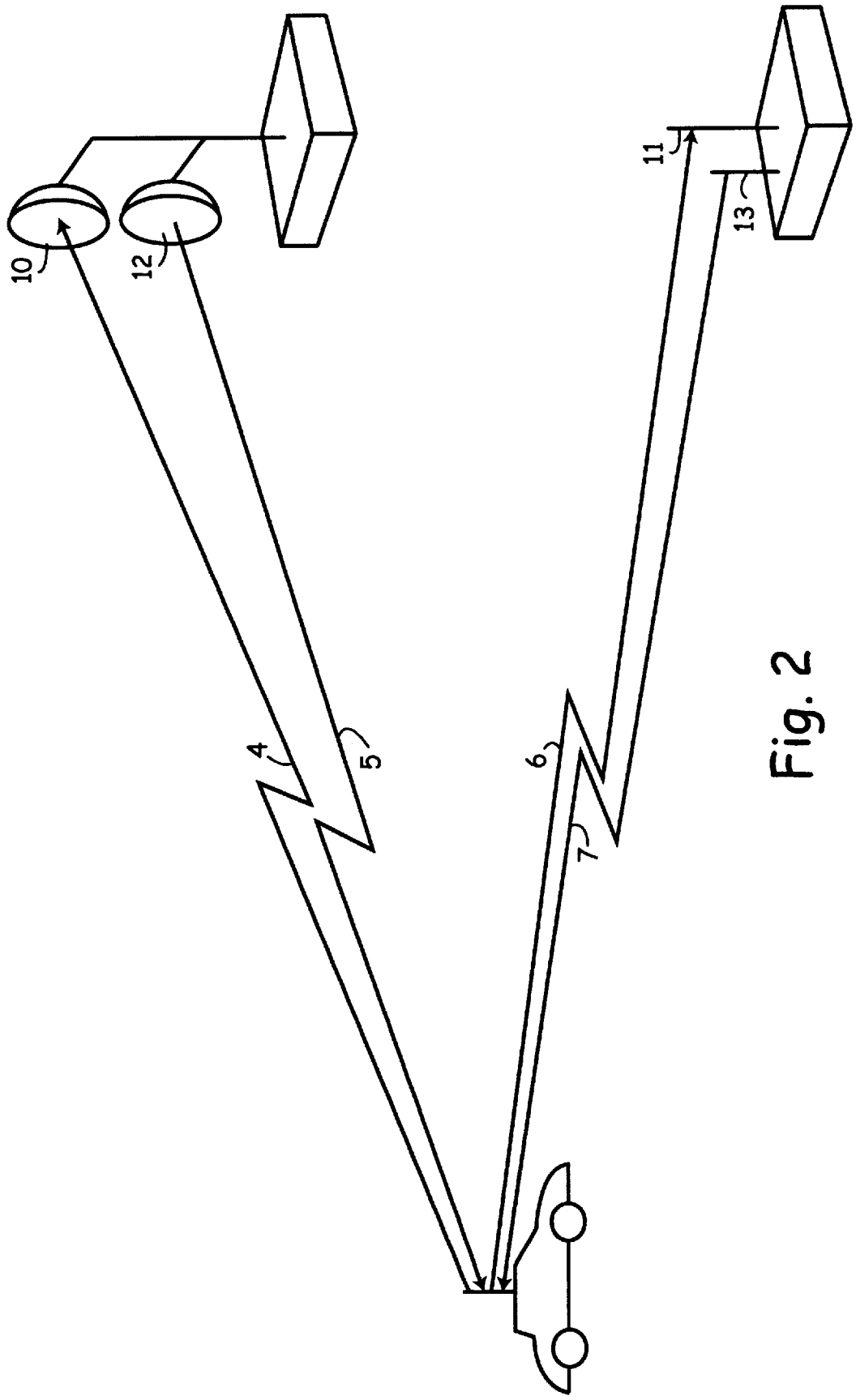
FIG. 2 is block diagram of the preferred embodiment of FIG. 1 where the warning signal transmitter antenna is located at different site than the priority service receiver antenna.

In FIG. 2, an alternate embodiment is shown wherein the warning signal antenna 12 and 13 is configured separate from the priority service receiver antenna 10 and 11. Again, preferably the warning signal antenna 12 and 13 is located as close as possible to the priority service antenna 10 and 11 to ensure that the warning signal 5 and 7 propagates along the same path as a potential interfering signal 4 and 6 from the mobile unit 1. This implementation might be required instead of that depicted in FIG. 1 to gain adequate isolation of the transmitted warning signal from the received priority service signal, or to avoid excessive expense in retrofitting an already existing priority service antenna with a feed and the associated RF circuitry for the warning signal.

Figure 3:
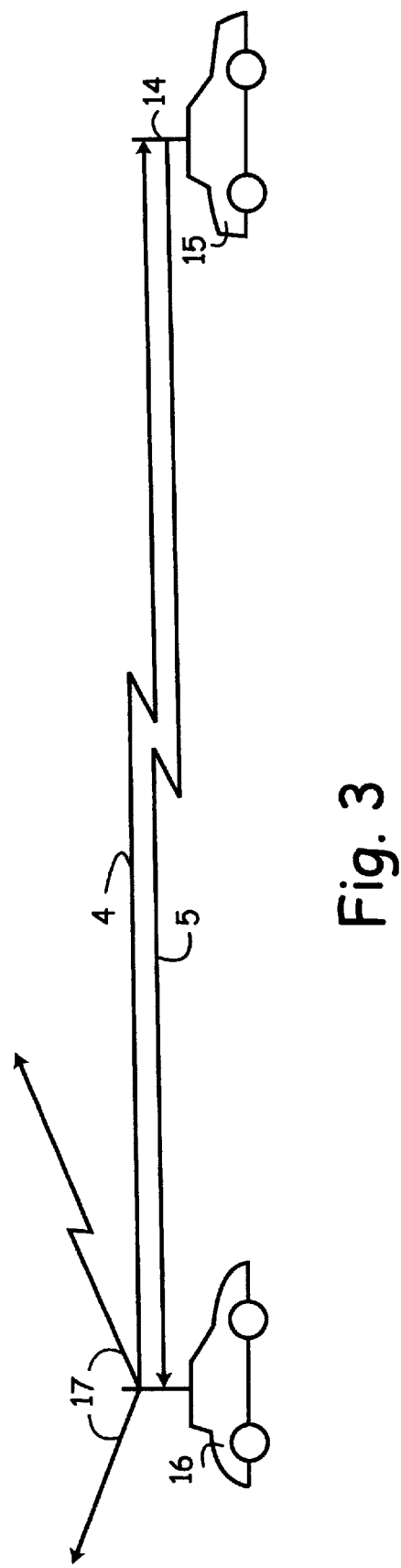
FIG. 3 is a block diagram of the preferred embodiment of FIG. 1 showing a mobile unit and priority service transmitter being a mobile unit.

FIG. 3 shows an embodiment of the present invention wherein the warning signal 5 is transmitted from the same antenna 14 as used for the receiver of a mobile priority service unit 15. Because the priority service unit 15 is moving through locations unknown to the potentially interfering mobile units 16 receiving the warning signal 5, it would not be possible to use a separate directional antenna 14 for the warning signal because it is not possible to point that antenna at all of the possibly interfering mobile units that are also at unknown locations. Therefore, it is preferred to use the same directional antenna 14 for transmitting the warning signal 5 as for transmitting the priority service. Conversely, it is anticipated that for most mobile units, an omni-directional antenna 17 will be used. Because there may be circumstances where it is impractical to collocate system warning signal antenna with the priority service receiver antenna, a separate antenna closely located on that mobile unit vehicle 15 may also be used.

Figure 4:
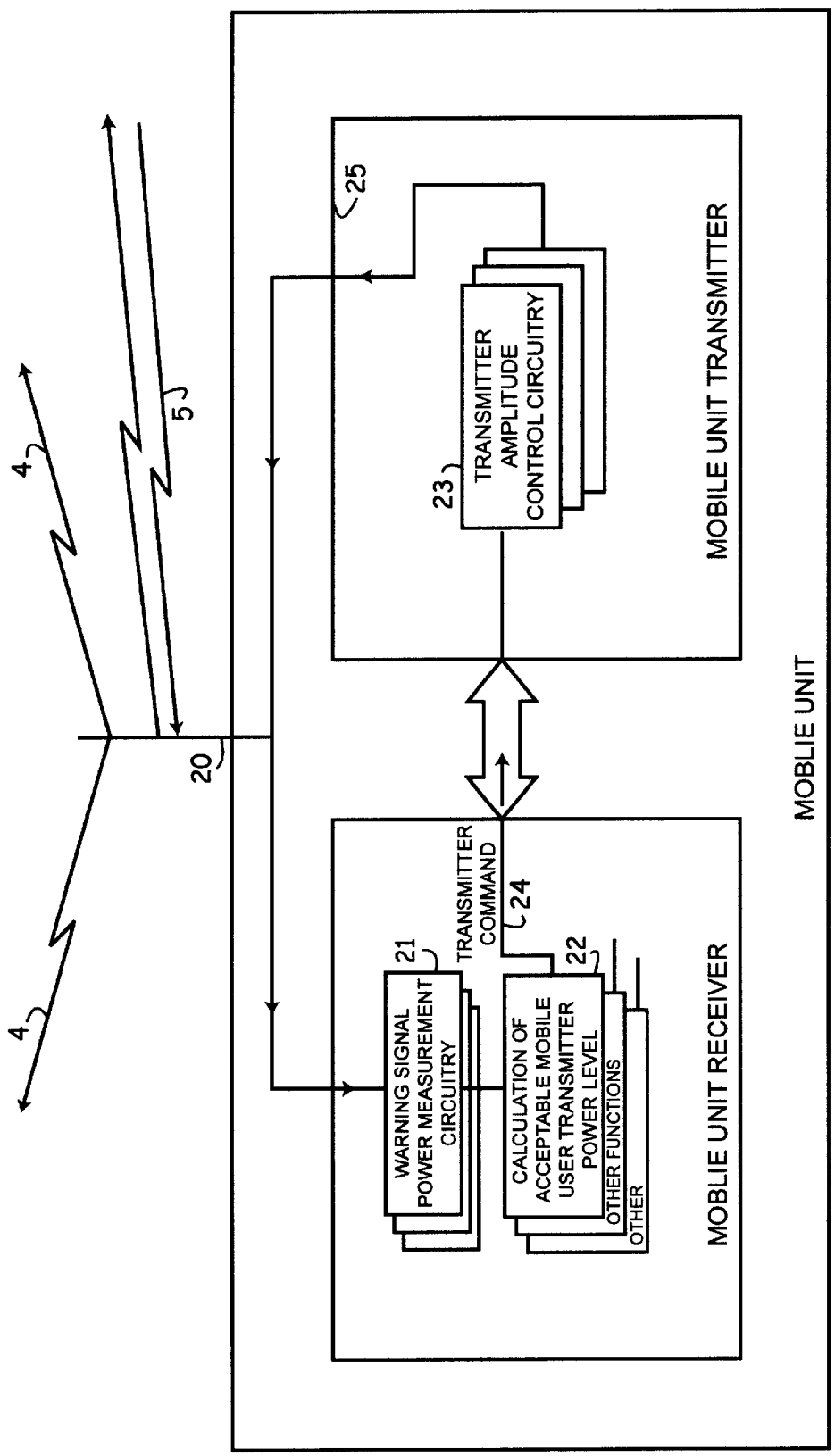
FIG. 4 shows a simple block diagram of a mobile unit receiver and transmitter wherein the warning service power measurement circuitry and transmitter command is integrated into the mobile unit.

Referring to FIG. 4, a mobile unit may also be receiving the warning signal 5 through the same antenna 20 as that which the potentially interfering signal 4 might be transmitted. Such an antenna might be directional, but preferably it would be omni-directional. Not shown is the RF circuitry to isolate the interfering signal from the warning signal, the design of which would be well known to those skilled in the art. A processor 21 is located within the mobile unit receiver that measures the received power. There are many ways known to those skilled in the art for implementing such a measurement, and the preferred embodiment depends on a trade off of the accuracy versus the cost of the circuitry and software. The mobile unit further includes a processor 22 for sending commands to the potentially interfering transmitter. The processor 22 takes into account the characteristics of the mobile unit transmitter as well as possible errors in the warning signal transmission power and the mobile unit warning signal power measurement circuitry. Connected to processor 22 is the transmitter amplitude control circuitry 23, also located within the mobile unit communications transmitter. The transmitter amplitude control circuitry receives a power command 24 from the processor 22 and, accordingly, adjusts the communications transmitted power of the mobile unit transmitter 25.

Figure 5:
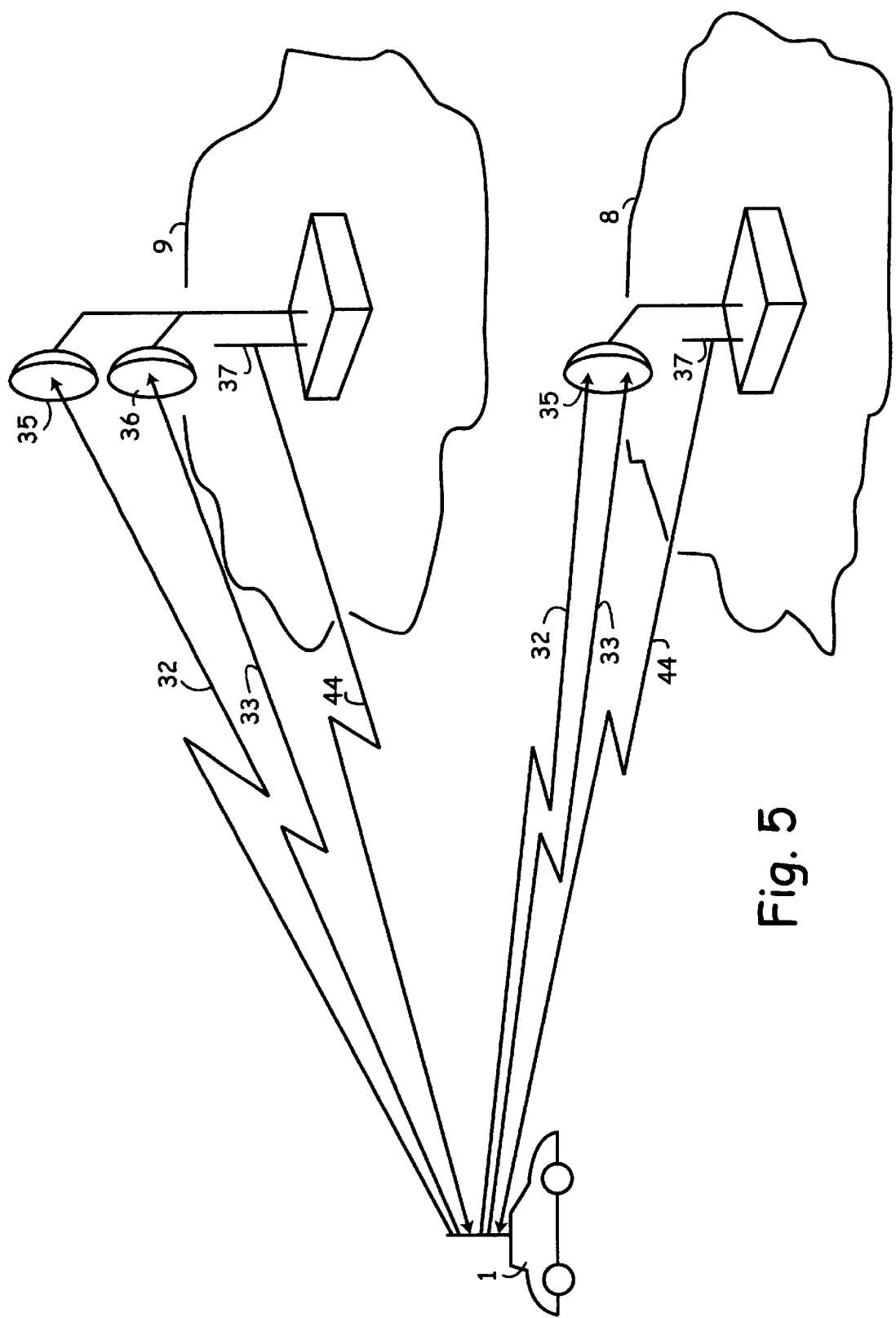
FIG. 5 is a block diagram showing a communications service mobile unit transmitting a potentially interfering signal and a warning signal used by the priority serve provider to precisely measure the received power from that mobile unit.

With reference to FIG. 5, in an additional preferred embodiment, the mobile unit 1 transmits potential interfering signals 32 and warning signals 33 that are received by a warning signal receiver that is collocated with the priority service receiver. Preferably, the warning signal receiver uses the same antenna 35 as the priority receiver. However, the warning signal receiver may use an antenna 36 closely located to the priority service antenna 35 which has very nearly the same coverage and pattern as the priority service antenna 35.

Figure 6:
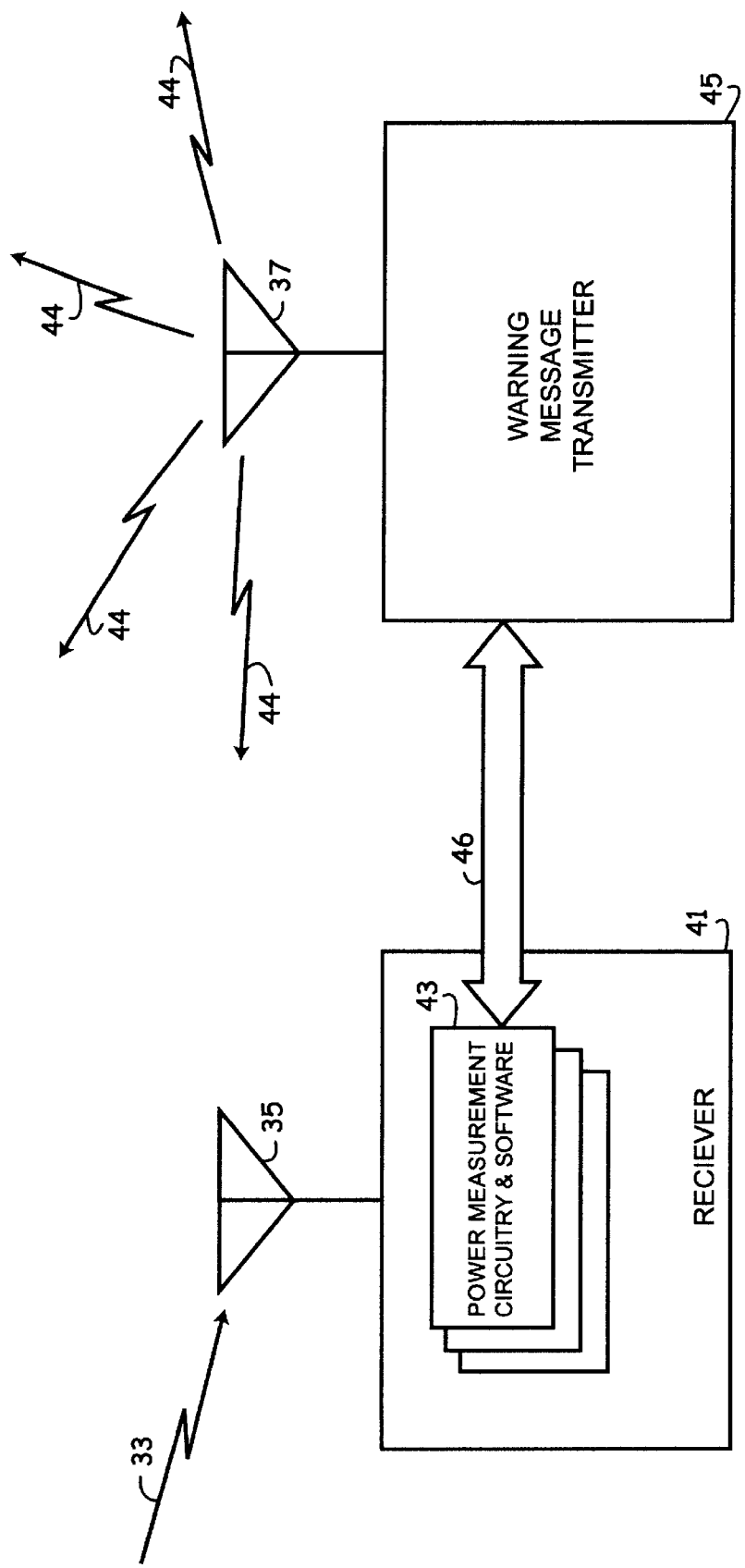
FIG. 6 is a block diagram showing a receiver for the mobile service that is collocated with the priority service receiver at the fixed site including power measurement circuitry and software as indicated that is used to measure the received power of a potentially interfering signal.

With reference also to FIG. 6, the warning signal receiver 41 collocated at the priority service site measures the power of the received warning signal transmitted by each mobile unit with power measurement circuitry and software 43. Preferably, the mobile units time share the special signal frequency and each mobile unit is identified on that signal. If the measured power level for a particular mobile unit exceeds a predetermined value, a warning message command 46 is communicated to the warning message transmitter 45 and a signal 34 with the warning message is transmitted to that mobile unit via antenna 37. The message commands that mobile unit to cease transmitting, to reduce its transmitted power a commanded amount to ensure that mobile unit does not interfere with the priority service receiver at that fixed site, or for the mobile unit to change its transmitting frequency to a non-interfering frequency. Preferably, the signal carrying the warning message is at a completely different frequency from that used by the priority service and is also set at a low enough level so that frequency side lobes will not interfere with the priority service receiver.

The principles of the invention may be applied to systems and methods for providing communications with mobile units in coexistence with other communications services or systems. While several particular forms of the invention have been illustrated and described, it will be apparent that various modifications can be made without departing from the spirit and scope of the invention. Accordingly, it is not intended that the invention be limited, except by the following claims.

I claim:

1. A communication system for permitting the communications of a mobile unit in proximity to a communications service having priority over the communications of the mobile unit, said communication system comprising:

a priority service unit for providing communications services including a receiver for receiving signals in a frequency band and a transmitter collocated with the priority service unit receiver for transmitting signals in a frequency band;

a mobile communications unit including a transmitter for transmitting in the frequency band in which said priority service unit receives signals;

an interference zone surrounding said priority receiver such that the transmission by said mobile unit in said interference zone interferes with the operation of said priority service unit;

warning signal means connected to said priority service unit for transmitting a warning signal from the priority service unit transmitter at a frequency band different than the frequency band of the signals received by the priority service unit;

warning signal receiver means connected to said mobile communications unit for receiving said warning signal;

interference zone detection means connected to said warning signal receiver means for processing said warning signal and for determining if said mobile unit is located in said interference zone; and interference elimination means connected to said interference zone detection means for eliminating the interference of said mobile unit with said priority service unit.

2. A communications system for permitting the communications of a mobile unit in proximity to a communications service having priority over the communications of the mobile unit, said communication system comprising:

a priority service unit for providing communications services including a receiver for receiving signals in a frequency band and a transmitter for transmitting signals in a frequency band;

a mobile communications unit including a transmitter for transmitting in the frequency band in which said priority service unit receives signals;

an interference zone surrounding sa id priority receiver such that the transmission by said mobile unit in said interference zone interferes with the operation of said priority service unit;

warning signals mean connected to said mobile communications unit for transmitting a warning signal at a frequency band different that the frequency band of the signals received by the priority service unit;

warning signal receiver means connected to said priority service unit for receiving said warning signal;

interference zone detection means connected to said warning signal receiver means for processing said warning signal and for determining if said mobile unit is located in said interference zone; and interference elimination means connected to said interference zone detection means for transmitting a warning command from said priority service unit transmitter to said mobile unit to eliminate the interference of said mobile unit with said priority service unit.

* * * * *